United States Patent [19]

Malone

[11] Patent Number: 5,640,929
[45] Date of Patent: Jun. 24, 1997

[54] UNDERWATER PLANTER

[76] Inventor: Joseph J. Malone, 2355 Harrison Ave., Baldwin, N.Y. 11510

[21] Appl. No.: 521,924

[22] Filed: Aug. 31, 1995

[51] Int. Cl.$^6$ ................................................. A01K 63/00
[52] U.S. Cl. ........................................ 119/248; 119/256
[58] Field of Search ................................... 119/221, 246, 119/248, 253, 256, 225

[56] References Cited

U.S. PATENT DOCUMENTS

| | | | |
|---|---|---|---|
| 3,122,126 | 2/1964 | Yamada | 119/225 |
| 3,324,829 | 6/1967 | De Jose et al. | 119/253 X |
| 4,006,710 | 2/1977 | Van Berkum | 119/256 |
| 5,189,981 | 3/1993 | Ewald, Jr. | 119/225 |
| 5,476,068 | 12/1995 | Townsend | 119/256 |

FOREIGN PATENT DOCUMENTS 1618 of 1858 United Kingdom .................. 119/256

Primary Examiner—Robert P. Swiatek
Assistant Examiner—Elizabeth Shaw

[57] ABSTRACT

A planter for retaining gravel and landscaping effects in underwater settings such as an aquarium is disclosed. The invention comprises a plurality of retaining walls disposed in an upstanding spaced apart relationship for forming a plurality of landscaping sections with each section having a different height from every other section for defining a terrace relationship with the adjacent retaining walls. A plurality of elongated spacers are disposed in paired releasable communication with the retaining walls for maintaining the spaced apart relationship between the adjacent retaining walls. Each retaining wall further has a plurality of apertures adapted for urging water flow from one landscaping section to the next lowermost adjacent landscaping section, and a second plurality of apertures adapted for urging cooperative engagement between adjacent elongated spacers. A base wall is disposed in an upstanding orientation and in a spaced apart relationship with the lowermost landscaping section retaining wall and a pump is provided for pumping the water from the aquarium to the highestmost landscaping section.

4 Claims, 4 Drawing Sheets

UNDERWATER PLANTER

BACKGROUND OF THE INVENTION

1. Field of the Invention

The present invention relates to a new and improved underwater planter and more particularly, pertains to an underwater planter having a plurality of retaining walls in a terraced relationship for maintaining the three dimensional landscaping vistas that the hobbyist creates by restricting animal access to the planter.

2. Description of the Prior Art

The use of underwater stabilization systems using rocks, driftwood and plants is known in the prior art. More specifically, underwater stabilization systems using rocks, driftwood and plants heretofore devised having many parts and being difficult to operate and maintain in conditions typically found in aquatic situations requiring the stabilization of visual aesthetic landscaping effects and in particular, maintaining the visual aesthetic landscaping effects in spite of the constant movement of the landscaping by the semi-aquatic animals when they move across the landscaping, or when they dig into the landscaping in search of food are known to consist basically of familiar, expected, and obvious structural configurations, notwithstanding the myriad of designs encompassed by the crowded prior art which has been developed for the fulfillment of countless objectives and requirements.

The prior art discloses a large number of underwater stabilization systems using rocks, driftwood and plants. By way of example, U.S. Pat. No. Des. 268,607 issued to Malik appears to disclose an aquarium filter.

U.S. Pat. No. Des. 317,966 issued to Willinger appears to disclose an aquarium filter.

U.S. Pat. No. 5,006,230 issued to Votive, III et al. discloses a dual action aquarium filtration system having intake means for aquarium water, pre-filter means, and water transfer means.

U.S. Pat. No. 5,167,607 issued to Thiemer et al. discloses a filter for an aquarium having a bottom chamber and a filter compartment for a filter material located above the bottom chamber. Water is supplied from above so as to pass through the filter compartment to the bottom of the chamber.

U.S. Pat. No. 5,171,438 issued to Korcz discloses an aquarium filtration system using biological and mechanical means. The system has the capability to also include chemical filtration.

U.S. Pat. No. 5,171,437 issued to Fletcher, Sr. discloses an intake aquarium filter medium for immersion within the aquarium tank and having a permeable synthetic filter material for urging movement of water therethrough for causing air bubbles to collect within the filter.

In this respect, the underwater planter according to the present invention substantially departs from the conventional concepts and designs of the prior art, and in doing so provides an apparatus primarily developed for the purpose of an underwater planter having a plurality of retaining walls in a terraced relationship for maintaining the three dimensional landscaping vistas that the hobbyist creates by restricting animal access to the planter.

It is therefore an object of the present invention to provide a new and improved underwater planter which has all the advantages of the prior art underwater stabilization systems using rocks, driftwood and plants and none of the disadvantages.

It is another object of the present invention to provide a new and improved underwater planter which may be easily and efficiently manufactured and marketed.

It is a further object of the present invention to provide a new and improved underwater planter which is of a durable and reliable construction.

An even further object of the present invention is to provide a new and improved underwater planter which is susceptible of a low cost of manufacture with regard to both materials and labor, and which accordingly is then susceptible of low prices of sale to the consuming public, thereby making such a underwater planter economically available to the buying public.

Still yet another object of the present invention is to provide a new and improved underwater planter which provides in the apparatuses and methods of the prior art some of the advantages thereof, while simultaneously overcoming some of the disadvantages normally associated therewith.

Even still another object of the present invention is to provide an underwater planter having a plurality of retaining walls in a terraced relationship for maintaining the three dimensional landscaping vistas that the hobbyist creates by restricting animal access to the planter.

Lastly, it is an object of the present invention to provide a planter for retaining gravel and landscaping effects in underwater settings comprising a plurality of retaining walls disposed in an upstanding spaced apart relationship for forming a plurality of landscaping sections. A plurality of elongated spacers are disposed in paired releasable communication with the retaining walls for maintaining the spaced apart relationship between the adjacent retaining walls. A base wall is disposed in an upstanding orientation and in a spaced apart relationship with the lowermost landscaping section retaining wall. Means are provided for pumping the water from the aquarium to the highestmost landscaping section.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Therefore, it can be appreciated that there exists a continuing need for a new and improved underwater planter which can be used for and more particular, an underwater planter having a plurality of retaining walls in a terraced relationship for maintaining the three dimensional landscaping vistas that the hobbyist creates by restricting animal access to the planter In this regard, the present invention substantially fulfills this need.

SUMMARY OF THE INVENTION

In view of the foregoing disadvantages inherent in the known types of underwater stabilization systems using rocks, driftwood and plants now present in the prior art, the present invention provides a new and improved underwater planter. As such, the general purpose of the present invention, which will be described subsequently in greater detail, is to provide a new and improved underwater planter which has all the advantages of the prior art and none of the disadvantages.

To attain this, the present invention essentially comprises a planter for retaining gravel and landscaping effects in underwater settings such as an aquarium. The invention comprises a plurality of retaining walls disposed in an upstanding spaced apart relationship that forms a plurality of landscaping sections. Each section has a different height from every other section that defines a terrace relationship with the adjacent retaining walls. A plurality of elongated spacers are disposed in paired releasable communication with the retaining walls that maintain the spaced apart relationship between the adjacent retaining walls. Each retaining wall further has a plurality of apertures adapted for urging water flow from one landscaping section to the next lowermost adjacent landscaping section, and a second plurality of apertures adapted for urging cooperative engagement between the adjacent elongated spacers.

A base wall is disposed in an upstanding orientation and is in a spaced apart relationship with the lowermost landscaping section retaining wall. Finally, means for pumping the water from the aquarium to the highestmost landscaping section is provided.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
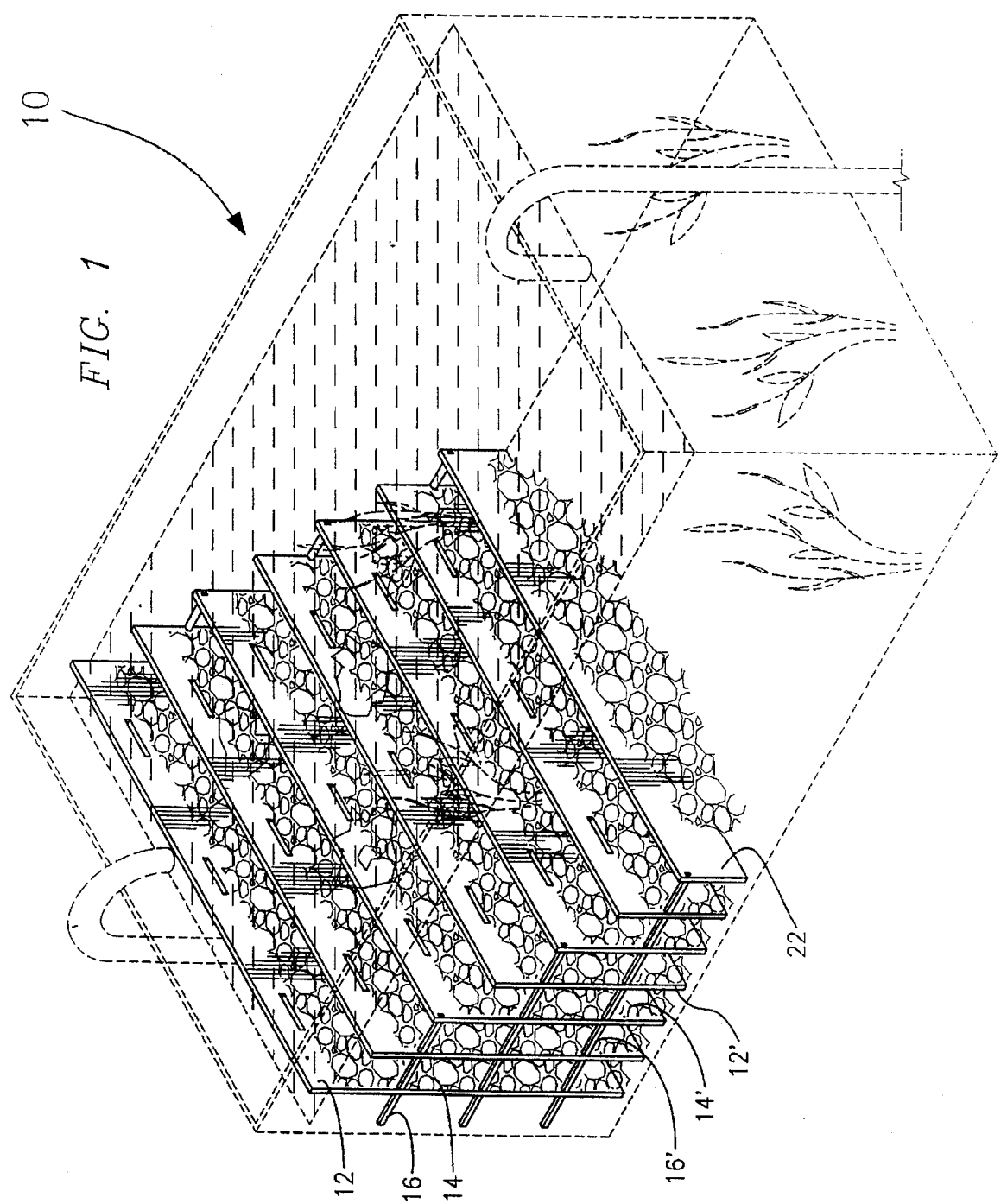
FIG. 1 is a perspective illustration of the preferred embodiment of the underwater planter constructed in accordance with the principles of the present invention.
Figure 2:
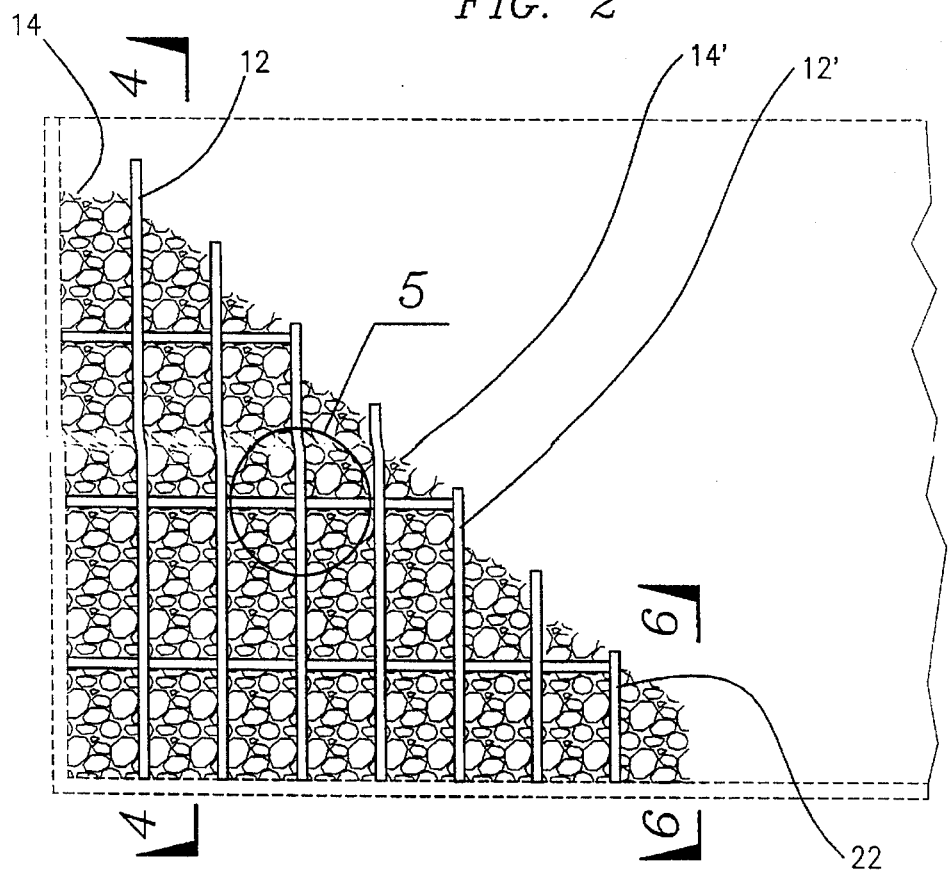
FIG. 2 is a left side view of the invention as disclosed in FIG. 1.
Figure 3:
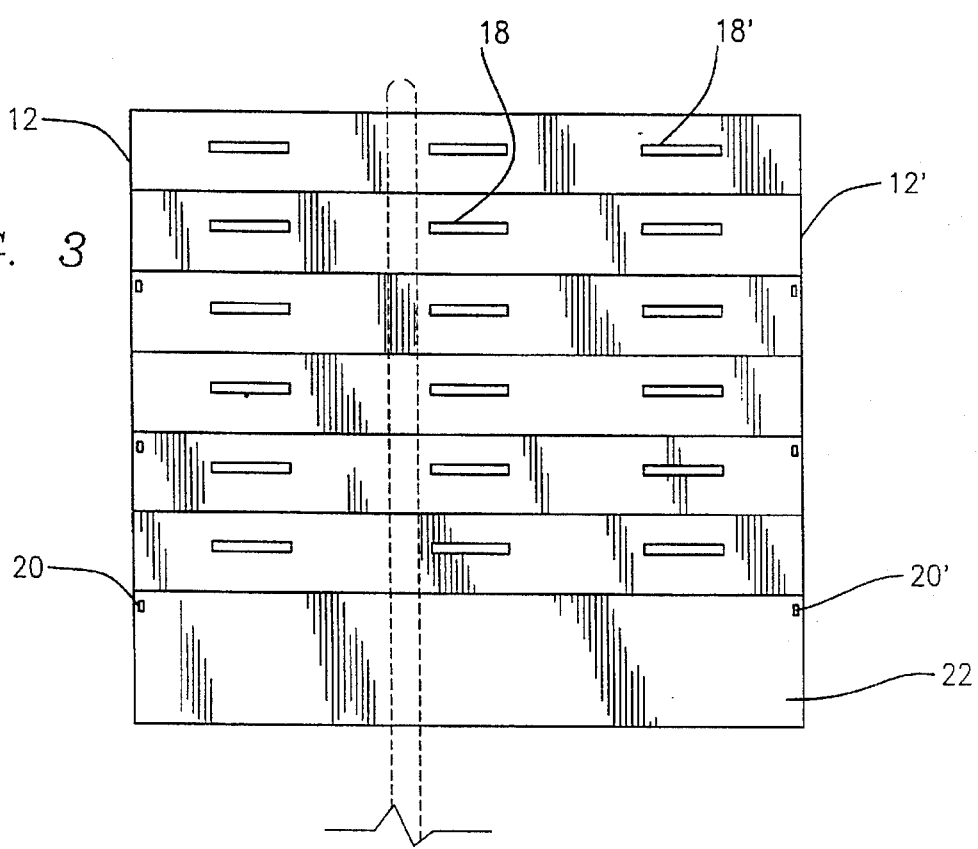
FIG. 3 is a front elevation view of the invention as disclosed in FIG. 1.
Figure 4:
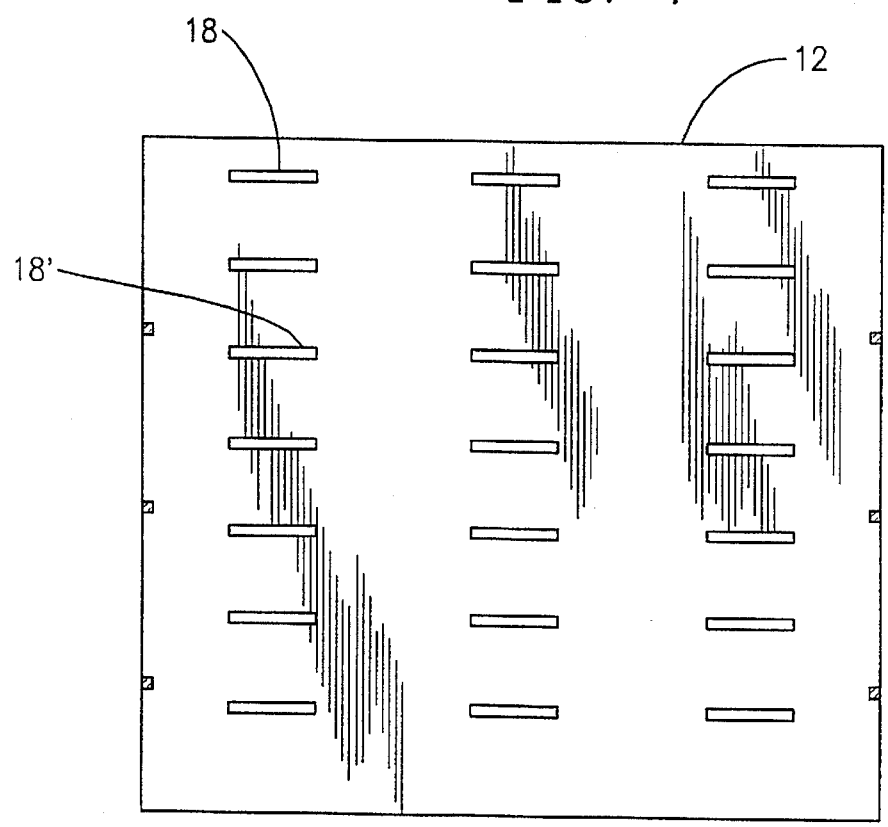
FIG. 4 is a vertical cross-sectional view of the invention taken along viewing lines 4—4 in FIG. 2.
Figure 5:
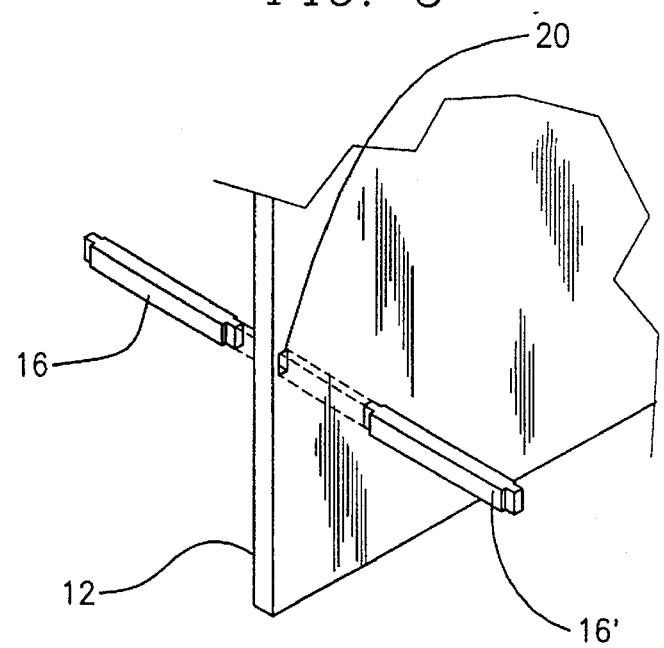
FIG. 5 is a fragmentary sectional view of the invention taken along viewing lines 5 in FIG. 2 disclosing the relationship of the spacers to the retaining walls.
Figure 6:
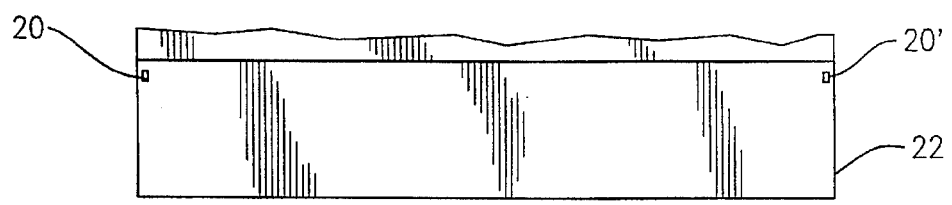
FIG. 6 is a vertical sectional view of the invention taken along viewing lines 6—6 in FIG. 2.
Figure 7:
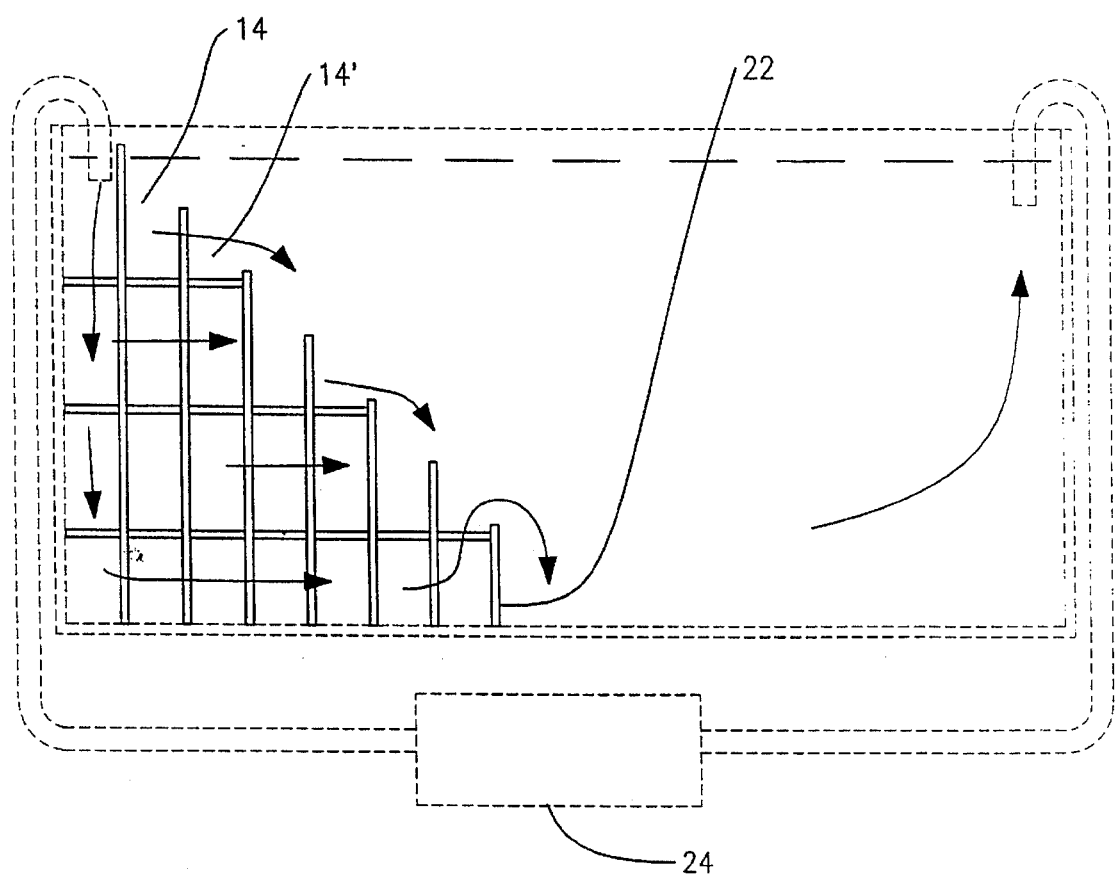
FIG. 7 is a conceptual schematic diagram illustrating the flow of the water through the planter and the return of the water by the external pumping and filtration means.

With reference now to the drawings, and in particular to FIGS. 1 through 7 thereof, the preferred embodiment of the new and improved underwater planter embodying the principles and concepts of the present invention and generally designated by the reference numeral 10 will be described.

The present invention, the new and improved underwater planter is a system comprised of a plurality of components. The components in their broadest context include a plurality of retaining walls, a plurality of elongated spacers and pumping means. Each of the individual components is specifically configured and correlated one with respect to the other to attain the desired objectives.

The construction of sloping hills inside of a semi-aquatic aquarium is a difficult task. Stabilization of landscaping can be achieved with the use of rocks, driftwood and plants. Hills of this nature will start to fall apart within a short time due to the constant intrusion of the semi-aquatic animals as they dig for food or walk across the surface of the landscaping. As a result, the landscape needs continuous maintenance.

The substrate retaining planter/filter has three main advantages over the prior art disclosed and functions very simply. First, the gradual decrease in height of the plastic plates act as retaining walls for the substrate. Second, the partitioning of the space acts as a planter to limit root competition. Also, the use of plants further decrease erosion. The third function is to act as an underground filter. The invention allows water to pass horizontally through slits located in the retaining walls rather than vertically as in conventional filtration systems.

The water is pumped or siphoned from the aquarium to a filter of any conventional type. That filter is usually located outside of the aquarium. The water return is positioned to allow the water to enter the highestmost compartment. The water will then flow horizontally in a terraced effect from the highest position to the lowest position. The device must be used in conjunction with a conventional filter in order to achieve full effectiveness. The primary application of the invention is to maintain the underwater landscaping, not to provide a filtration system.

Referring generally to FIG. 1, the invention 10 has a plurality of retaining walls 12, 12' disposed in an upstanding spaced apart relationship. The retaining walls 12, 12' form a plurality of landscaping sections 14, 14'. Each section 14, 14' has a different height from every other section 14' which defines a terrace relationship with the adjacent retaining walls 12, 12'.

A plurality of elongated spacers 16, 16' are disposed in paired releasable communication with the retaining walls 12, 12' and maintain the spaced apart relationship between the adjacent retaining walls 12, 12'.

Each retaining wall 12 further has a plurality of apertures 18, 18' adapted for urging water flow from one landscaping section 14 to the next lowermost adjacent landscaping section 14'. A second plurality of apertures 20, 20' are adapted for urging cooperative engagement between the adjacent elongated spacers 16, 16'.

A base wall 22 is disposed in an upstanding orientation and is in a spaced apart relationship with the lowermost landscaping section 14' and retaining wall 12'. A pump 24 moves the water from the aquarium to the highestmost landscaping section 14.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved planter for retaining gravel and landscaping effects in underwater settings such as an aquarium comprising in combination:

a plurality of retaining walls disposed in an upstanding spaced apart relationship for forming a plurality of landscaping sections, each section having a different height from every other section for defining a terrace relationship with the adjacent retaining walls;

a plurality of elongated spacers disposed in paired releasable communication with the retaining walls for maintaining the spaced apart relationship between the adjacent retaining walls;

a plurality of apertures in each retaining wall adapted for urging water flow from one landscaping section to the next lowermost adjacent landscaping section;

a second plurality of apertures adapted for urging cooperative engagement between adjacent elongated spacers;

a base wall disposed in an upstanding orientation and in a spaced apart relationship with the lowermost landscaping section retaining wall; and means for pumping the water from the aquarium to the highermost landscaping section.

2. An underwater planter comprising:

a plurality of retaining walls disposed in an upstanding spaced apart relationship for forming a plurality of landscaping sections, a plurality of elongated spacers disposed in paired releasable communication with the retaining walls for maintaining the spaced apart relationship between the adjacent retaining walls, a base wall disposed in an upstanding orientation and in a spaced apart relationship with a lowermost landscaping section retaining wall, and means for pumping the water from an aquarium to a highermost landscaping section, wherein each section has a different height from every other section for defining a terrace relationship with the adjacent retaining walls.

3. An underwater planter apparatus for preventing erosion of landscape located within the an aquarium comprising:

an aquarium;

at least one retaining wall disposed in an upstanding orientation within the aquarium for forming at least one landscaping section, a coupling means in communication with the at least one retaining wall for maintaining the position of the at least one retaining wall, and means for pumping the water horizontally from said aquarium to the at least one landscaping section rather than passing vertically, wherein the at least one retaining wall further includes a plurality of apertures adapted for urging water flow to the at least one landscaping section;

whereby the retaining wall retains and prevents erosion of the at least one landscape section located within the aquarium.

4. An underwater planter as recited in claim 3 wherein each retaining wall further includes a second plurality of apertures adapted for urging cooperative engagement between the coupling means which comprises opposed adjacent elongated spacers.

* * * * *